March 21, 1933. E. C. HARTER 1,902,166
CASTER MECHANISM FOR STANDS AND THE LIKE
Filed Nov. 13, 1930 2 Sheets-Sheet 1
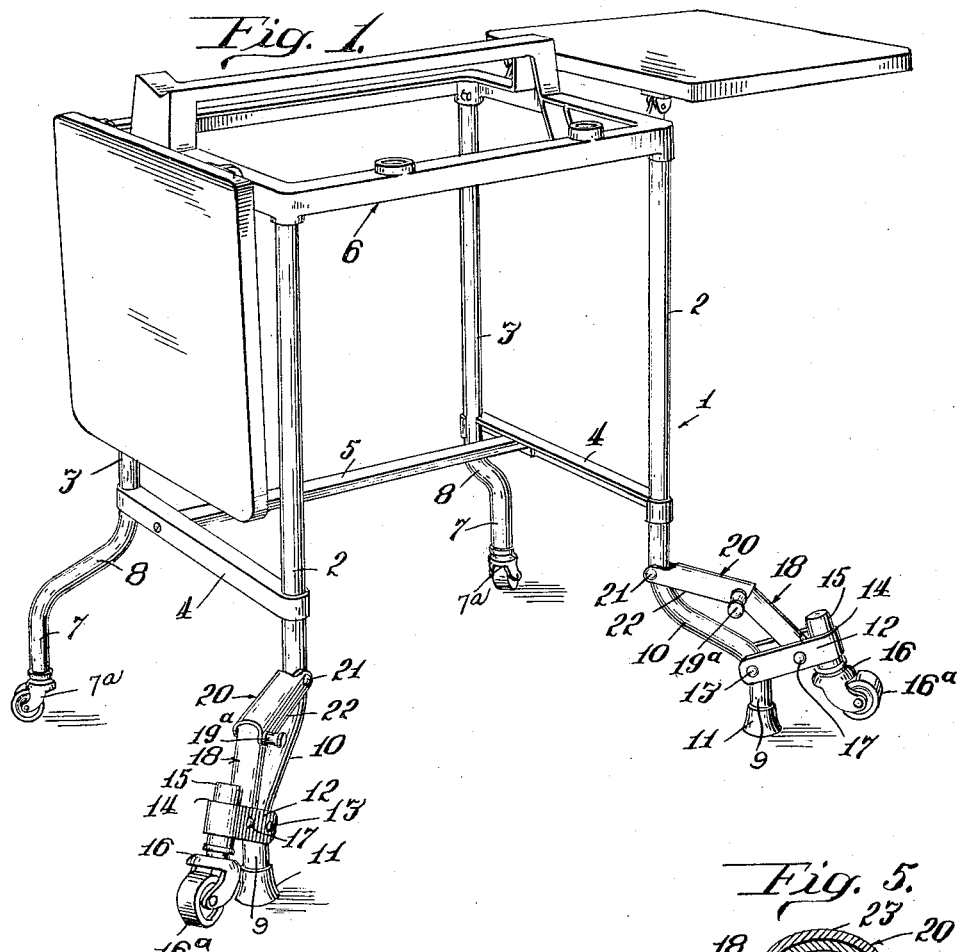
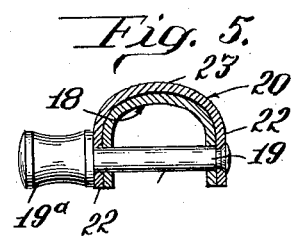
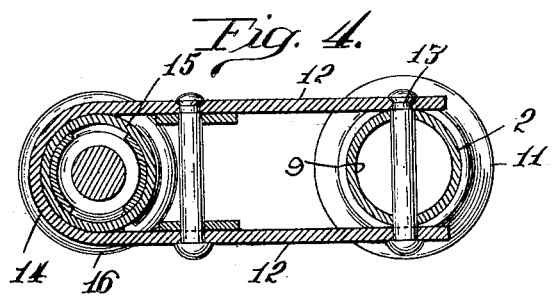
Inventor
Evan C. Harter
By Arthur Wm Nelson
Attorney

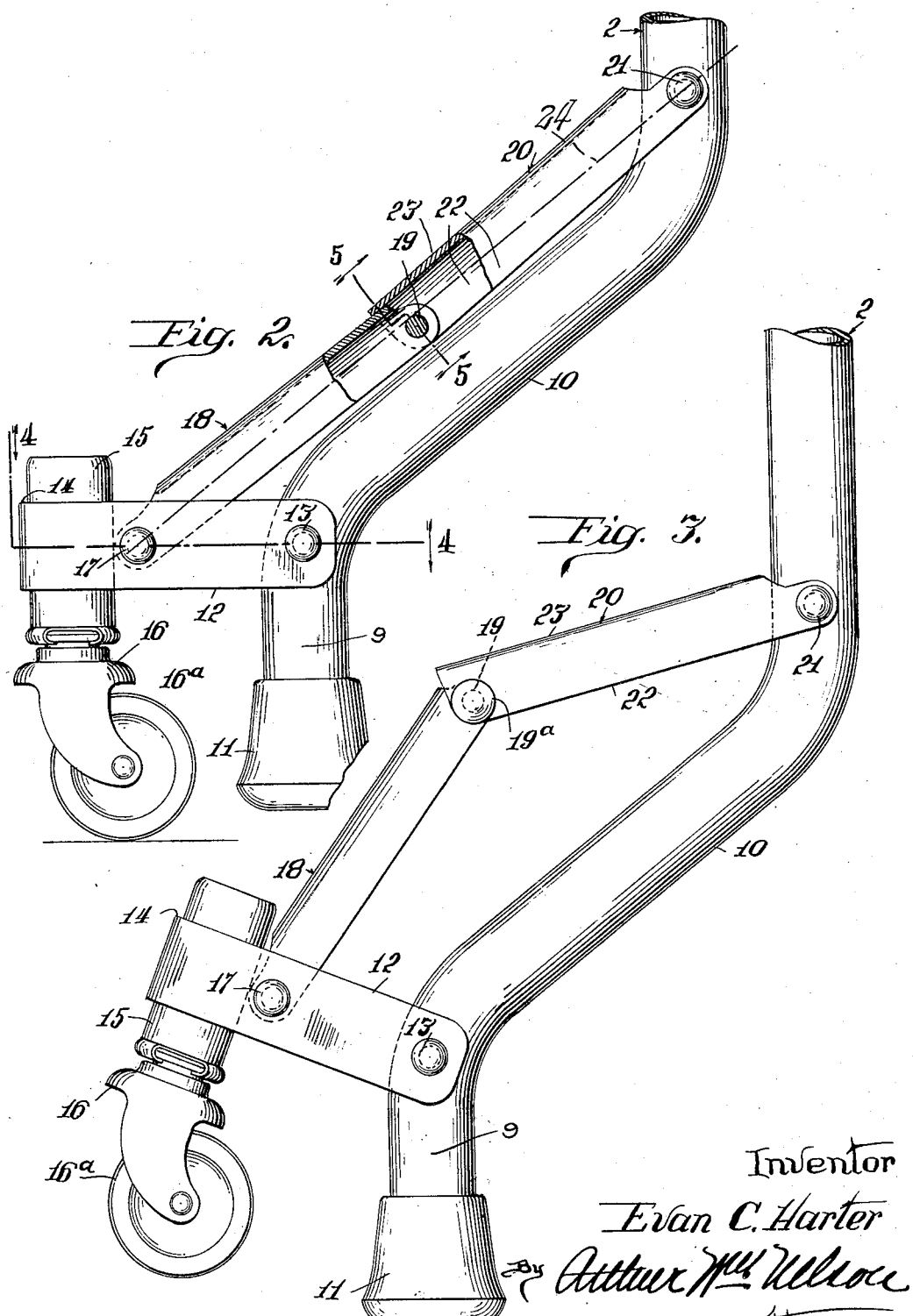

Patented Mar. 21, 1933

1,902,166

UNITED STATES PATENT OFFICE

EVAN C. HARTER, OF STURGIS, MICHIGAN

CASTER MECHANISM FOR STANDS AND THE LIKE

Application filed November 13, 1930. Serial No. 495,351.

This invention relates to improvements in caster mechanism for stands and the like and it consists of the matters hereinafter described and more particularly pointed out in the appended claims.

The primary object of the invention is to provide a mechanism associated generally with the two front legs of the stand whereby the associated casters may be moved into and out of engagement with the floor so that the stand may be easily moved from one place of use to another upon all of the casters of the stand, when so desired.

A further object of the invention is to provide a mechanism of this kind which may be foot actuated without stooping and which includes a lever and toggle like arrangement, the links being so formed as to automatically lock in one limit of movement to hold the casters in that position wherein they are engaged with the floor.

These objects of the invention as well as others, together with the many advantages thereof, will more fully appear as I proceed with my specification.

In the drawings:—

Fig. 1 is a perspective view of an office machine stand embodying the preferred form of my improved caster mechanism.

Fig. 2 is a view in side elevation on an enlarged scale of the bottom end of one of the front legs of the stand, with the associated caster engaged with the floor.

Fig. 3 is a view similar to Fig. 2 with the parts in changed relation whereby the associated caster is out of engagement with the floor.

Fig. 4 is a horizontal sectional view through the same as taken on the line 4—4 of Fig. 2, and Fig. 5 is a detail sectional view as taken on the line 5—5 of Fig. 2.

In general the stand in which my improved caster mechanism is embodied, comprises two side frames each including a front and a rear leg tied together near their bottom ends by a bar, the bars of both frames being connected together by a cross bar and the top ends of all of the legs being fixed in and connected to the frame upon which the desired office machine is supported. The bottom ends of all of the legs are bent to extend radially with respect to the axis of the frame and the bottom extremity of each rear leg has a caster while the bottom extremity of each front leg carries a rubber or like tip.

Associated with the bottom end of each front leg is a caster mechanism including a lever pivoted to the leg and a toggle link arrangement pivoted at one end to said lever and at the other end to said leg above the lever. When foot pressure is imposed upon the mid portion of said toggle link arrangement, the lever is swung downwardly to forcibly engage the caster with the floor and thus elevate the leg end extremity tip, off the floor so that the stand as a whole may be easily moved about from one place of use to another on the casters.

A lifting movement imparted to said mid portion of the toggle link arrangement, breaks the toggle and lifts the associated caster off the floor and engages the associated extremity tip therewith whereby accidental movement or shifting of the stand is quite impossible.

Referring now in detail to that embodiment of the invention illustrated in the drawings:—1 indicates as a whole an office machine stand comprising side frames each including an upright front leg 2 and an upright rear leg 3 connected together near their bottom ends by a tie bar or rail 4. The rails of both frames are connected by a cross bar 5 and the top ends of the legs of both frames are all fixed in the several corners of a frame 6 made to receive and support the office machine for which the stand was intended.

The extreme bottom end part 7 of each rear leg is offset outwardly from and is connected to the main part of said leg by an outwardly and downwardly inclined part 8 and said extreme bottom end part is provided with a swiveling caster 7a. The extreme bottom end part 9 of each front leg is likewise offset outwardly from and is connected to the main part of said leg by an outwardly and downwardly inclined part 10 and said extreme bottom end part is provided with a friction or rubber tip 11. The bottom end parts of all of said legs are disposed in planes radial with respect to the perpendicular axis or center of stand as a whole to impart that spread to the legs which will insure stability for the stand as a whole.

Associated with the bottom end of each front leg is a caster mechanism comprising a bifurcated lever or arm having laterally spaced side arms 12—12 which at one end straddle opposite sides of a leg part 9 to be pivoted thereto as at 13; the other ends of said arms being connected together by a crotch or junction 14. Secured in said crotch or junction is an upright tubular stem 15 in which is journalled in any suitable manner, the pintle of a swiveling caster frame 16 carrying a caster wheel 16ª.

The bifurcated lever has pivoted thereto at 17 one end of a toggle link 18 which is pivoted at its other end as at 19 to one end of an associated toggle link 20. The other end of this link 20 is formed to embrace and is pivoted as at 21 to main part of the leg 2 above that inclined part 10 thereof as best shown in Fig. 2.

Preferably each toggle link is made of a U-shaped cross section comprising side walls or flanges 22 and a rounded connecting web 23. That end of the link 20 pivoted as at 19 to the link 18 embraces the same to limit the movement of the links in one direction. The pivot 19 which is an ordinary pin or rivet is provided at one end with a head or extension 19ª to be engaged by the operator's foot when so desired.

Foot pressure upon the toggle links 18 and 20 in the vicinity of the pivot 19, will cause said links to be extended or brought into and through end to end alignment and this will cause the bifurcated lever or arm to be swung downwardly about its pivot 13 and will forcefully engage the caster 16ª with the floor which will lift or raise the leg tip 11 off the floor. It is pointed out that this foot pressure upon said links in the vicinity of the pivot 19, will cause said pivot to pass through and beyond a plane passing through the pivots 17 and 21 and which plane is indicated by the dotted line 24 in Fig. 2. The parts are so proportioned that in the movement of said links in this direction, the engagement of the embracing end of the link 20 with the end of the link 18 will limit said movement just after the pivot 19 passes through the plane before mentioned.

Thus said links are locked together and the weight of the supported machine cannot spring the links into their folded position but on the contrary, act to make this locking of the toggle links more secure.

With the caster 16ª in this position, the stand as a whole may be easily shifted about from one place of use to another upon all of the casters. When the desired place of use has been reached, the operator engages the toe of the shoe under the button or extension 19ª and lifts the same upwardly. This will swing the pivot 19 through and beyond the plane indicated by said line 24 and at the same time will swing the bifurcated lever upwardly so that the caster likewise moves upwardly and the leg extremity tip moves down into engagement with the floor. Slight further upward movement on the button or extension 19ª will cause the links to fold into the position shown in Fig. 3 which effectively clears the caster from the floor. It is pointed out that these various pivots mentioned are relatively stiff and hold the parts in this position until again actuated.

Thus with the parts in this last mentioned position, to bring the caster into engagement with the floor it is only necessary to impose foot pressure on the toggle link in the vicinity of the pivot 19.

The parts are relatively few in number and may be easily assembled and are so positioned upon the associated leg as to be out of the way when not in use for their intended purpose. The mechanism may be operated by the foot and this eliminates stooping.

While in describing the invention I have referred in detail to the form, arrangement and construction of the parts thereof, the same is to be considered merely as illustrative so that I do not wish to be limited thereto except as may be specifically set forth in the appended claims.

I claim as my invention:—

1. In combination with a stand leg having an offset bottom end adapted for friction engagement upon a floor, a swiveling caster, means pivoted at one end to said offset bottom end of the leg and carrying said caster at the other end, and toggle links pivoted to said pivoted means and to said leg above said bottom end and which links are pivoted together, said links being operable to be moved into substantial alignment to swing said pivoted means to engage said caster with the floor, and to automatically lock against reverse movement when so moved into substantial alignment.

2. In combination with a stand leg having an offset bottom end adapted for friction engagement upon a floor, a swiveling caster, means pivoted at one end to said offset bottom end of the leg and carrying said caster at the other end, links pivoted to said pivoted means and to said leg above said bottom end and which links are pivoted together, and means associated with said links where so pivoted together and adapted to be foot operated to move said links into substantial alignment and to so swing said pivoted means as to engage said caster with said floor, said links being so formed as to automatically lock against reverse movement when so moved into said substantial alignment.

3. In combination with a stand leg having an offset bottom end adapted for engagement upon a floor, a bifurcated lever pivoted at one end to said offset bottom end of the leg, a caster connected to the other end of said lever, a link of channel like cross section pivoted at one end to said lever, a second link of channel like cross section pivoted at one end to said leg above said offset bottom end, and means for pivoting the other ends of both links together, said last mentioned means when said links are moved into substantial alignment being capable of being moved through and to one side of a plane extending between the pivotal points of said links with said lever and leg respectively.

In testimony whereof, I have hereunto set my hand, this 10th day of November, 1930.

EVAN C. HARTER.